(12) United States Patent
Ganjyal

(10) Patent No.: US 8,877,277 B2
(45) Date of Patent: Nov. 4, 2014

(54) SUPERCRITICAL FLUID EXTRUSION METHOD, APPARATUS AND SYSTEM FOR MAKING A FOOD PRODUCT

(75) Inventor: Girish Ganjyal, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 157 days.

(21) Appl. No.: 13/306,634

(22) Filed: Nov. 29, 2011

(65) Prior Publication Data
US 2013/0136830 A1    May 30, 2013

(51) Int. Cl.
*A23P 1/12* (2006.01)
(52) U.S. Cl.
USPC ........... 426/449; 426/450; 426/499; 426/514; 426/516; 426/518; 426/520; 426/808; 426/143; 426/640; 426/661
(58) Field of Classification Search
CPC .............. A23L 1/0076–1/0094; A23L 1/1641; A23L 1/1802–1/1815; A23P 1/12–1/148
USPC ......... 426/640, 661, 445–450, 456, 465, 499, 426/576, 518, 520, 808, 143, 514, 516
See application file for complete search history.

(56) References Cited

U.S. PATENT DOCUMENTS

| | | |
|---|---|---|
| 1,725,171 A | 4/1924 | Anderson |
| 2,855,315 A | 10/1958 | Perrozzi |
| 3,041,176 A | 7/1959 | Baker |
| 3,450,538 A | 6/1969 | McKown |
| 3,472,663 A | 10/1969 | Laskin |
| 3,541,946 A | 11/1970 | Johnston |
| 3,615,675 A | 10/1971 | Wisdom |
| 3,986,890 A | 10/1976 | Richter |
| 4,038,433 A | 7/1977 | Manser |
| 4,054,271 A | 10/1977 | Lanzillo |
| 4,218,480 A | 8/1980 | Dyson |
| 4,341,803 A | 7/1982 | Koshida |
| 4,364,961 A | 12/1982 | Darley |
| 4,418,088 A | 11/1983 | Cantenot |
| 4,423,078 A | 12/1983 | Darley |
| 4,438,146 A | 3/1984 | Colby |
| 4,465,702 A | 8/1984 | Eastman |
| 4,515,822 A | 5/1985 | Kraig |
| 4,568,550 A | 2/1986 | Fulger |
| 4,594,322 A | 6/1986 | Thompson |
| 4,609,558 A | 9/1986 | Giacone |
| 4,618,499 A | 10/1986 | Wainwright |
| 4,675,198 A | 6/1987 | Sevenants |
| 4,762,723 A | 8/1988 | Strong |
| 4,786,514 A | 11/1988 | Wiedmann |
| 4,844,936 A | 7/1989 | Cox |
| 4,846,054 A | 7/1989 | Mange |

(Continued)

FOREIGN PATENT DOCUMENTS

WO    2007070616 A2    6/2007
WO    2010132060 A1    11/2010

*Primary Examiner* — Drew Becker
(74) *Attorney, Agent, or Firm* — James R. Gourley; Colin P. Cahoon; Carstens & Cahoon, LLP

(57) ABSTRACT

A method for making an expanded snack piece using supercritical fluid extrusion is disclosed. A mixture of shear thinning starch and heat-sensitive ingredients are input into an extruder, hydrated, and mixed with supercritical fluid. The extrudate can be subjected to further processing to set or alter its structure.

12 Claims, 3 Drawing Sheets

(56) References Cited

U.S. PATENT DOCUMENTS

| | | | |
|---|---|---|---|
| 4,880,653 A | 11/1989 | Keller | |
| 4,888,192 A | 12/1989 | Ramnarine | |
| 4,946,697 A | 8/1990 | Payne | |
| 4,948,609 A | 8/1990 | Nafisi-Movaghar | |
| 4,960,043 A | 10/1990 | van Lengerich | |
| 4,961,943 A | 10/1990 | Blanthorn | |
| 4,979,434 A | 12/1990 | van Lengerich | |
| 5,011,696 A | 4/1991 | Haas | |
| 5,079,012 A | 1/1992 | Lengerich | |
| 5,084,296 A | 1/1992 | Lugay | |
| 5,089,283 A | 2/1992 | Wilson | |
| 5,120,559 A * | 6/1992 | Rizvi et al. | 426/446 |
| 5,124,161 A | 6/1992 | van Lengerich | |
| 5,132,127 A | 7/1992 | Wisdom | |
| 5,364,643 A | 11/1994 | Morimoto | |
| 5,417,992 A * | 5/1995 | Rizvi et al. | 426/283 |
| 5,480,673 A | 1/1996 | Rokey | |
| 5,558,890 A | 9/1996 | Brown | |
| 5,603,973 A * | 2/1997 | Benson et al. | 426/243 |
| 5,718,931 A | 2/1998 | Walter | |
| 6,027,758 A * | 2/2000 | McHugh et al. | 426/615 |
| 6,041,696 A | 3/2000 | Su | |
| 6,086,933 A | 7/2000 | Rockstrom | |
| 6,180,151 B1 | 1/2001 | Geng | |
| 6,277,423 B1 | 8/2001 | Orosa | |
| 6,287,621 B1 | 9/2001 | Lacourse | |
| 6,375,995 B1 | 4/2002 | Glaser | |
| 6,773,734 B2 * | 8/2004 | Sirohi et al. | 426/89 |
| 6,881,429 B2 | 4/2005 | Geng | |
| 7,097,869 B2 | 8/2006 | Hayabuchi | |
| 7,235,276 B2 * | 6/2007 | Allen et al. | 426/549 |
| 7,569,244 B2 | 8/2009 | Jordan | |
| 7,648,723 B2 | 1/2010 | Zimeri | |
| 2004/0166203 A1 * | 8/2004 | Gautam et al. | 426/74 |
| 2006/0286270 A1 | 12/2006 | Jordan | |
| 2007/0122529 A1 | 5/2007 | Thai | |
| 2007/0172559 A1 | 7/2007 | Capodieci | |
| 2007/0281064 A1 | 12/2007 | Xu | |
| 2008/0026122 A1 | 1/2008 | Bows | |
| 2008/0102165 A1 | 5/2008 | Ning | |
| 2008/0145483 A1 | 6/2008 | Berrios | |
| 2008/0206424 A1 * | 8/2008 | Villagran | 426/555 |
| 2008/0254180 A1 | 10/2008 | Windhab | |
| 2008/0280006 A1 | 11/2008 | Onwulata | |
| 2009/0081337 A1 | 3/2009 | Amiri | |
| 2009/0155444 A1 | 6/2009 | Yakubu | |
| 2010/0021593 A1 | 1/2010 | Denis | |
| 2010/0037699 A1 | 2/2010 | Dautremont | |
| 2010/0055284 A1 * | 3/2010 | Karwowski et al. | 426/560 |
| 2010/0196560 A1 | 8/2010 | Cousin | |
| 2010/0209562 A1 | 8/2010 | Henriet | |
| 2010/0227025 A1 | 9/2010 | Creighton | |
| 2010/0239720 A1 * | 9/2010 | Jensen et al. | 426/94 |
| 2011/0008515 A1 | 1/2011 | Peterson | |
| 2011/0014343 A1 | 1/2011 | Jordan | |
| 2011/0086145 A1 | 4/2011 | Rodriguez Campisto | |
| 2011/0305809 A1 | 12/2011 | Madsen | |

* cited by examiner

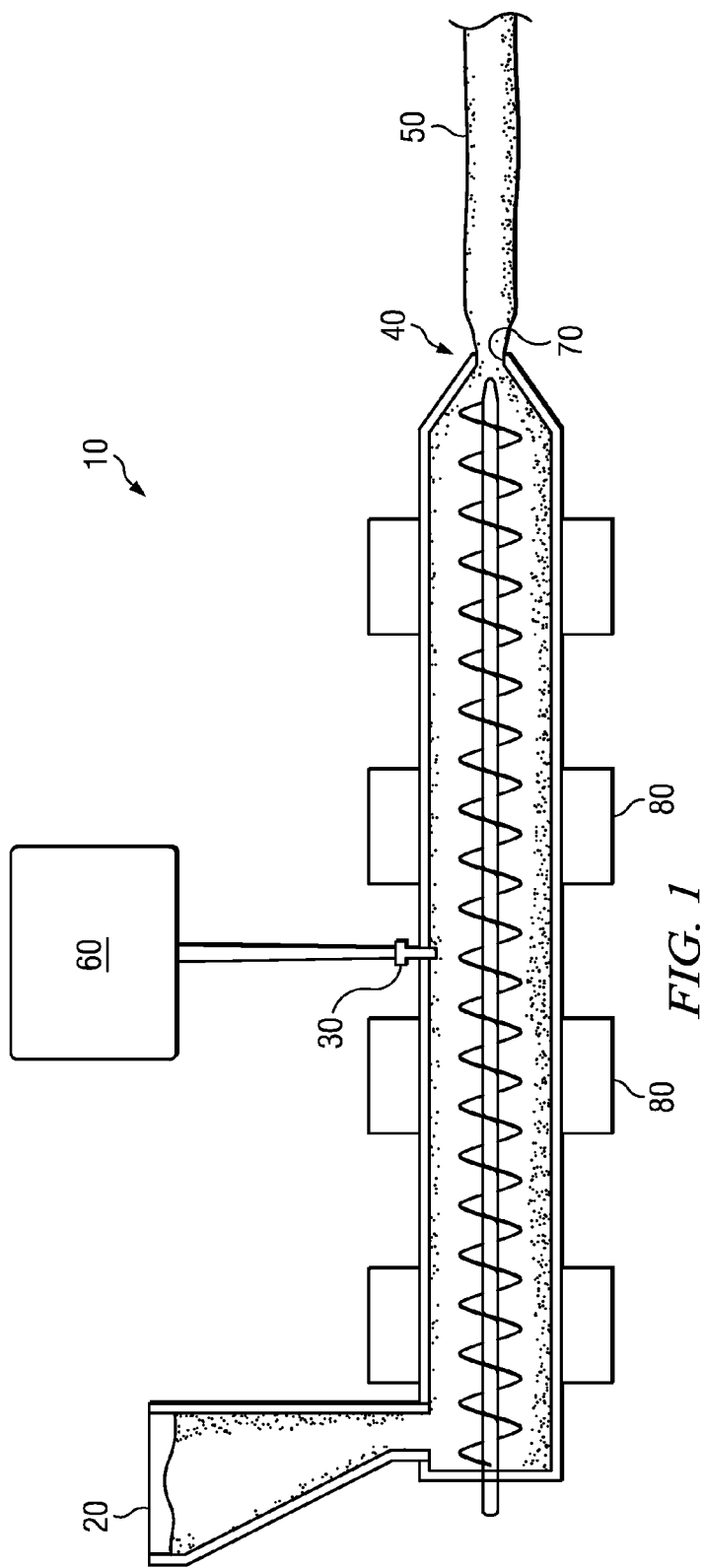
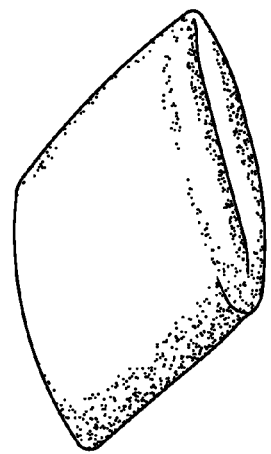
FIG. 1
FIG. 2
FIG. 3

SUPERCRITICAL FLUID EXTRUSION METHOD, APPARATUS AND SYSTEM FOR MAKING A FOOD PRODUCT

BACKGROUND OF THE INVENTION

1. Technical Field

The present invention relates to a method for making an improved expanded snack food and, more particularly, to a method for making a expanded or puffed extrudate having high nutritional content remaining from fruit or vegetable input ingredients, novel shapes, and texture characteristics.

2. Description of Related Art

Puffed snack food products are popular consumer items for which there exists a great demand. Snacks can also play a large role in the diet of consumers, and consumer demand for healthy snacks has dramatically increased.

Fruits and non-starchy vegetables are generally good sources of vitamins, minerals and other healthy compounds such as anti-oxidants. Different fruits and vegetables are rich in different nutrients, and the United States Department of Agriculture (USDA) recommends consumption of between 5 and 13 servings of a variety of fruit and vegetables per day, depending on the specific individual's needs. According to the Food and Drug Administration, a diet that is high in fiber can reduce a person's risk of certain cancers, diabetes, digestive disorders, and heart diseases, as well as aid weight management. Furthermore, vitamins and minerals are widely recognized as part of a healthy diet, and antioxidants may reduce the risk of heart disease and cancer.

A healthy, nutritious snack should ideally meet several criteria that include limits on fat, including saturated and trans-fatty acids, cholesterol, sodium, and added sugar. Preferably, the criteria should also include products formulated to have specific health or wellness benefits.

Although fruits and vegetables can be consumed raw or cooked in their natural form, some people find that consuming whole fruits and vegetables as a snack to be impractical, inconvenient, and generally undesirable. Prior art dried fruit and vegetable snack foods generally take the form of dehydrated slices of whole fruits or vegetables. These prior art dehydrated slices typically do not have the light, crispy texture desired by consumers, nor do they retain the native nutrients and flavors present in the starting ingredients. Other types of fruit or vegetable snacks in the prior art have included trivial or insubstantial amounts of fruit or vegetable, thus they are not nutritionally different from traditional potato chips. No prior art snack food has been able to deliver high levels of fruits or vegetables, along with the additional hallmarks of nutritious snacks listed above, in the form of a light, crispy snack product.

Prior art direct expanded products, such as snacks produced and marketed under the Cheetos® brand label, are typically made by extruding corn meal and/or other raw materials through a die having a small orifice at high temperature and pressure. The water vapor pressure in the hot extrudate causes expansion, or puffing of the extrudate as it exits the small orifice. As disclosed in U.S. Pat. No. 6,607,772, assigned to the same assignee of the present invention, the typical ingredients for the starting raw material consists of corn meal and water. High temperature/high pressure extrusion is not ideal for use with fruit and vegetable content, for reasons described in the detailed description below.

SUMMARY OF THE INVENTION

The present invention provides a great tasting, healthy, extruded, puffed snack piece having a high content of heat-sensitive ingredients, such fruit or vegetable solids, and a light, crispy texture. Fruit or vegetable solids are incorporated into the puffed snack piece by including fruit content in various forms as an ingredient. In one aspect of the invention, fruit or vegetable content is combined with pregelatinized starch inside an extruder, supercritical fluid is injected into the mixture under the pressure conditions inside the extruder. The supercritical fluid turns to a gas upon reaching atmospheric pressure as it exits the extruder, thereby expanding the extrudate.

In another aspect of the invention, the extrudate is cut into pieces and subjected to specific post-processing operations that serve to alter the structure of the extrudate pieces. In one embodiment, a cylindrical extrudate piece is subjected to vacuum drying, which causes an axial hole to form in the extruded product. In another embodiment, the extrudate piece is subjected to jet impingement drying, which causes the piece to further expand and puff. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a schematic of the apparatus used for making the extruded snack product of the present invention.

FIG. 2 is a perspective view of a snack piece made according to the present invention that includes an axial hole.

FIG. 3 is a perspective view of a snack piece made according to the present invention that is shaped like a pillow, with a low density interior.

DETAILED DESCRIPTION

Figure 4:
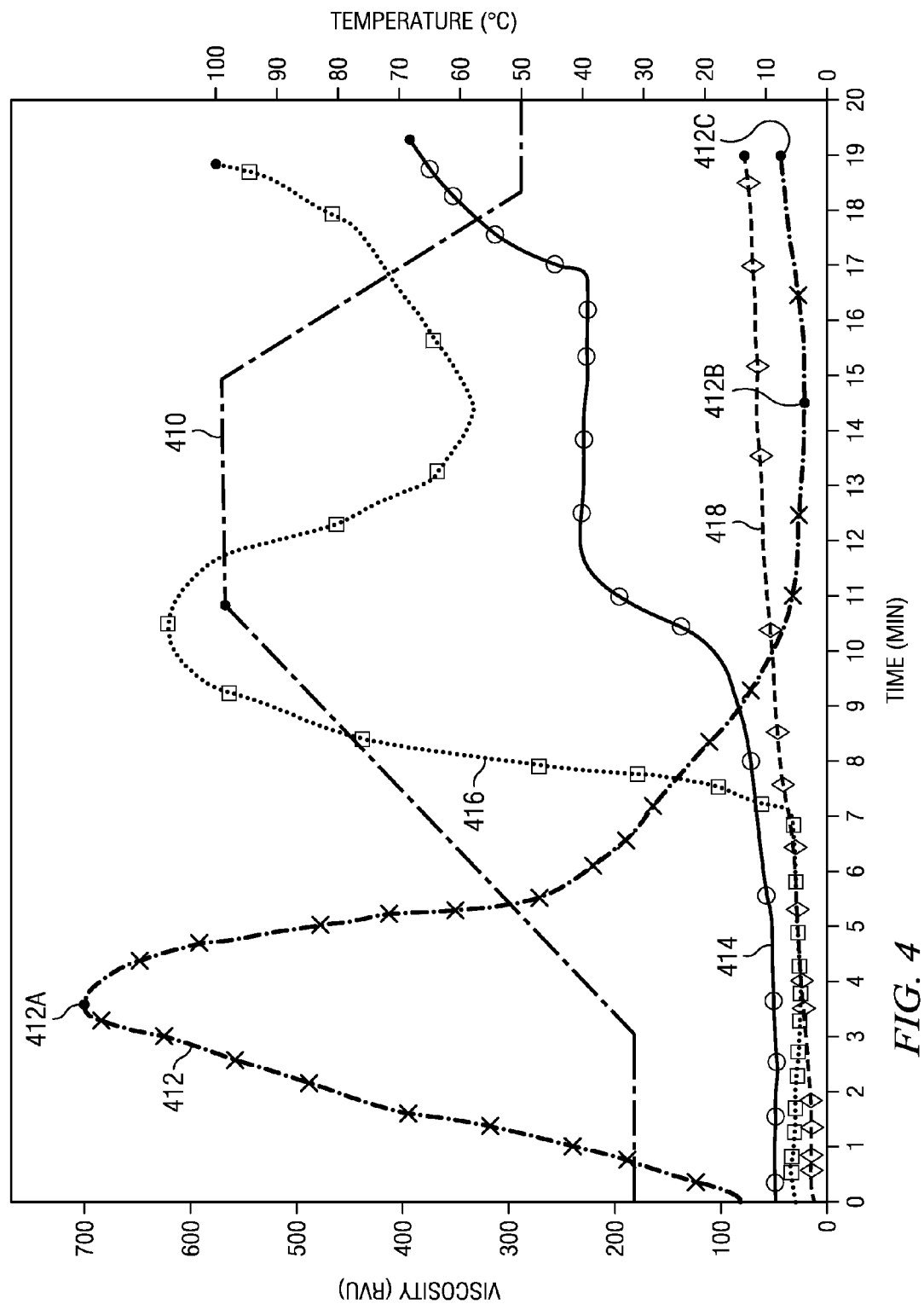
FIG. 4 is a graph showing the Rapid Visco Analyzer (RVA) profile for various starches tested with the present invention.

The extruded snack pieces of the present invention are extruded snacks that retain a high proportion of the heat-sensitive components found in the initial ingredients, such as natural flavoring compounds and nutrients, and have a light, crispy texture. Non-limiting examples of heat-sensitive ingredients or ingredients with heat-sensitive components include fruit- and vegetable-based ingredients, ingredients with high levels of sugar, certain proteins such as whey proteins, flavoring compounds that have been isolated from their native source (natural flavoring compounds) or synthesized (synthetic flavoring compounds), and coloring agents.

The heat-sensitive components survive during the process of the present invention by, throughout the entire process, maintaining the temperature of the extruded ingredients below a temperature at which the heat-sensitive components break down. In the broadest sense of the invention, puffed or expanded extrudates are produced at temperatures below the boiling point of water (about 100° C.). However, the present invention also works at even lower temperatures, which lower temperatures further broaden the number of heat-sensitive ingredients that will survive the process. In one embodiment, the temperature of the ingredients is maintained below about 90° C.; in a preferred embodiment, the temperature is maintained below about 85° C.; in a most preferred embodiment, the temperature is maintained below about 80° C.

As described previously, the prior art produces expanded products by heating ingredients inside an extruder to a temperature above the boiling point of water (or, above about 100° C.) at high pressure, passing them through a die orifice, and allowing the water to flash off as vapor, thereby expanding or puffing the extrudate. Many prior art processes also heat the ingredients to temperatures well above 100° C. in order to gelatinize any starches present in the starting ingredients. The present invention avoids heating the ingredients above the boiling point of water by using a supercritical fluid as the expanding agent, which can be injected into the ingredients inside the extruder in a liquid or supercritical state at low temperature. Because the extruder does not contain a cooking section, any temperature sensitive components of the starting ingredients survive the extrusion process, which has never been done before in the art.

FIG. 1 depicts a schematic cross-sectional representation of a supercritical fluid extruder in accordance with one embodiment of the present invention. The extruder 10 can be a single screw or multiple screw extruder. In a preferred embodiment, the extruder is a twin screw extruder. More generally, the extruder can comprise any device that mixes ingredients together under pressure and forces the ingredient mixture through at least one die orifice to form an extrudate. The ingredients and, optionally, water, are fed to the extruder 10. In one embodiment, the ingredients are preconditioned with water before being fed into the extruder. A high pressure pump (not shown) may be used to feed the preconditioned ingredients into the extruder 10. Supercritical fluid is fed from a supercritical fluid source 60 into the extruder 10 at a port 30 located downstream of the entrance 20. The supercritical fluid source may include a number of tanks, pumps, heat exchangers, meters and valves (not shown) that work together to feed fluid in a supercritical state into the extruder. In a preferred embodiment, the supercritical fluid is carbon dioxide at conditions beyond its supercritical point (about 31° C. and 1087 psi), such that it is in a supercritical state. The extruder may also comprise one or more heat exchanger jackets 80. Cooling fluid such as water can be pumped through the jackets 80 to cool the barrel temperature and cool the ingredients inside the extruder.

The supercritical fluid mixes with and dissolves in the ingredients inside the extruder 10 to form a melt or dough. When the dough exits the extruder 10 through an orifice 70 at the die face 40 as an extrudate, the supercritical fluid becomes a gas and expands the extrudate 50 as it changes state. The resulting product is an extrudate exiting the extruder that is expanded with small, uniformly sized air cells in locations where the supercritical fluid has changed from liquid to gas. The individual cells are supported by a surrounding structure of starch and other ingredients. In one embodiment, supercritical carbon dioxide is injected into the extruder at a rate of between about 0.1% and 3% by weight of the ingredients being fed into the extruder. In a preferred embodiment, the supercritical fluid is injected at a rate of between about 0.5% and 2.5%, and in a most preferred embodiment between about 0.8% and 2.0%.

Figure 5:
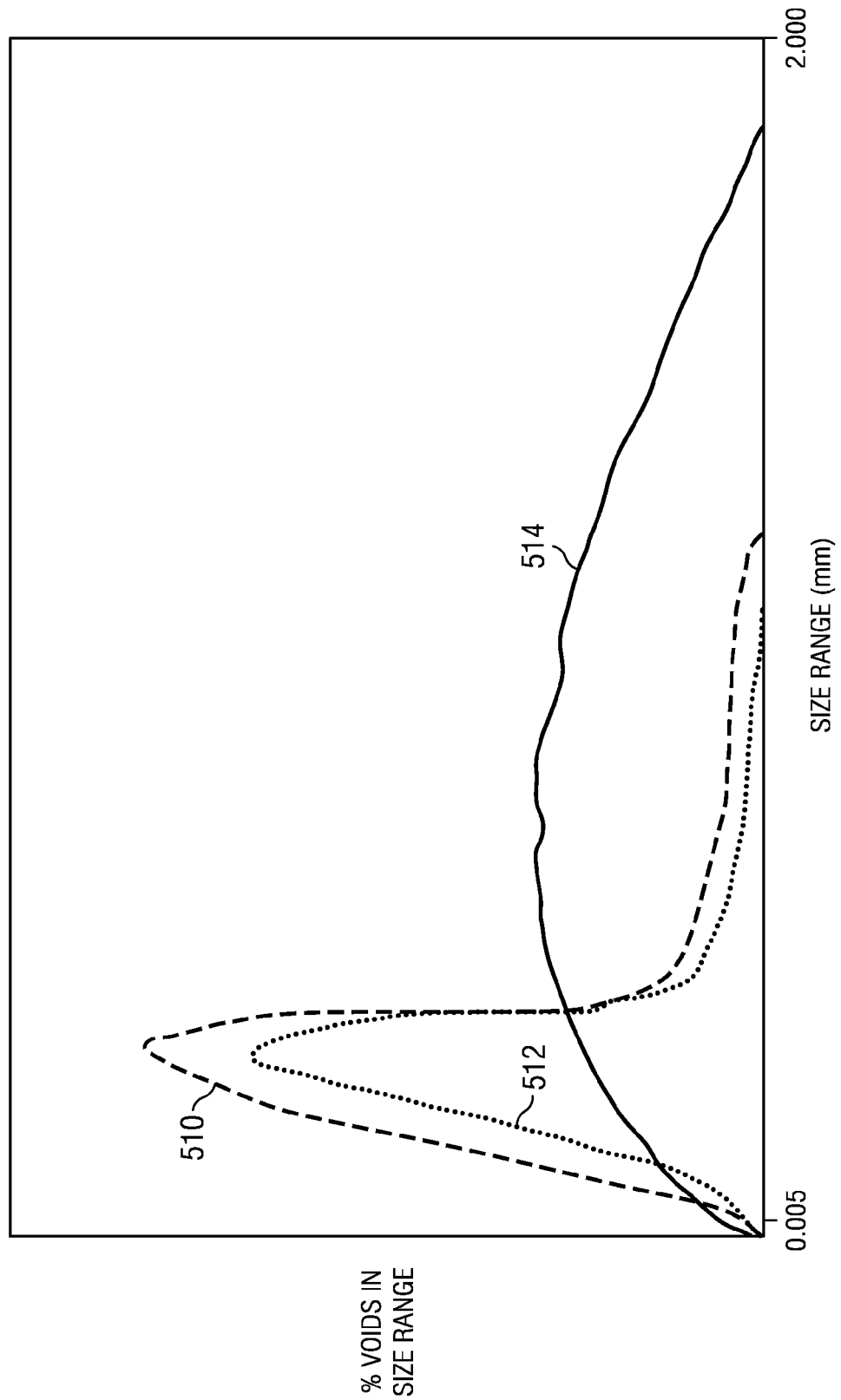
FIG. 5 shows the void size distribution profile for two embodiments of the snack product of the present invention and a prior art snack product.

The small voids created when supercritical fluid turns to gas can be readily distinguished from the voids created in high temperature, direct expanded puffed extrudates. Generally the void sizes are far more uniform, and grouped towards the low end of the void size spectrum. By contrast, direct expanded extrudates show a more random distribution across the void size spectrum. FIG. 5 is a plot that shows the percent of voids falling within size ranges from about 0.005 mm to about 2 mm. Two different supercritical fluid extrudates are represented by lines 502 and 504, while a high temperature direct expanded puff is represented by line 506. The cell structure of the supercritical fluid extrudates show a marked difference in size distribution than the high temperature, direct expanded extrudate.

In one embodiment, the final products made from supercritical extrudates maintain the same or similar cell size and distribution throughout any post-extrusion process, such as a drying process. However, the cell size, structure and distribution can also be modified before or during post-extrusion processing. For example, the generally spherical cells can be stretched into shapes resembling spheroids, ovoids or ellipsoids by stretching the extrudate, before or after they are cut into pieces. The cell structure and texture can also be modified in other ways by post-extrusion processing, as described in detail below.

In one embodiment, the input ingredients and moisture content are also adjusted to provide an extrudate that can be effectively cut at the die face and produce extrudate pieces that retain their expansion during subsequent drying operations. Applicants herein have discovered that a combination of pregelatinized starches with specific characteristics and viscosity profiles, and input moisture content, can be processed using the equipment described above to produce an extrudate that can be cut into individual snack pieces using a rotating cutter at the die face and subsequently dried using various drying techniques to produce snack food pieces with an expanded, low density structure.

The preferred starches used with the present invention are pregelatinized starches that have a certain viscosity profile when measured using a Rapid Visco Analyzer (RVA), which is indicative of other important characteristics of the starches that work well in accordance with the present invention, including hydration, shear thinning, gel strength, film forming, and diffusivity. The starches used in the ingredient formulations of one embodiment of the present invention must be pregelatinized because there is no cooking section of the extruder. Preferred pregelatinized starches found to work well with the present invention are XPANDR612 starch, available from the A.E. Staley Company in Decatur, Ill., and pregelatinized, extruded rice starch (which did not work quite as well as the XPANDR612 starch). These starches were chosen after extruding numerous types of starches, including native starches and dextrinized starches, from many different manufacturers, through the supercritical fluid extruder apparatus at various moisture contents.

FIG. 4 depicts several example RVA profiles for starches that were tested using the supercritical fluid extruder described above and depicted in FIG. 1. The RVA curve 412 represents the XPANDR612 starch that worked best with the present invention. The RVA curves 414, 416 and 418 for several other starches run through the supercritical fluid extruder are also depicted in FIG. 4. Interestingly, the RVA curve for the extruded, pregelatinized rice starch that did work with the present invention was very similar in shape to the RVA curve 412 for XPANDR612. The RVA analysis was run under the following conditions: the sample was held at about 25° C. for about 3 minutes, the temperature was increased to about 90° C. over the following approximately 7 minutes, held at about 90° C. for the following 4 minutes, cooled to about 50° C. over the following 4 minutes, and held at 50° C. for the final minute.

The RVA analyses discussed above were run on a Newport Scientific Rapid Visco Analyzer, model number RVA-4. The procedure used to measure the RVA for each sample was as follows: (1) Determine moisture content of sample (the moisture content data for these trials were gathered using a Mettler Toledo HR-83); (2) Determine amount of sample to add for 15% solids; (3) Tare metal sample container on balance and add determined amount of sample; (4) Add deionized water until balance reads 28g; (5) Scrape bottom of sample container with glass rod (without stirring) in order to insure sample will be well mixed; (6) Insert plastic paddle into sample container; (7) Insert sample container with paddle into RVA; (8) Choose temperature profile described above and depicted in FIG. 4, and wait for RVA to reach set temperature; (9) Push sample container down into RVA; (10) Wait approximately 20 minutes for RVA to complete analysis. The procedure above is referred to herein as the RVA Protocol.

As can be seen in FIG. 4, curves 414, 416 and 418 differ markedly from curve 412. Curve 412 ascends to a peak viscosity 412A of about 600 Rapid Visco Units (RVU; 1 RVU=approx. 12 cP) at about 2 minutes, then descends to a trough viscosity 412B of about 42 RVU at about 15 minutes, and extends to a final viscosity 412C of about 64 RVU at 19 minutes. By stark contrast, curve 414 (representing a rice flour starch sample) shows two levels of increasing viscosity, curve 416 (representing a tapioca starch sample) shows a long period of no change in viscosity, followed by a rapid peak, trough, and final peak, and curve 418 (representing a pregelatinized corn starch) shows a relatively flat, slightly ascending viscosity profile.

Thus, a starch that can be used in one embodiment of the present invention will comprise a peak viscosity of between about 500 and about 700 RVU at a time between about 1 and 6 minutes, a trough viscosity of between about 20 and 60 RVU at between about 12 and 18 minutes, and a final viscosity of between about 45 and 85 RVU at about 19 minutes, as measured using the RVA Protocol.

The XPANDR612 starch has three other important characteristics, which are evident from the viscosity profile. First, it hydrates quickly when added to water under shear and at low temperature, forming a gel. This can be seen in RVA profile 412 in FIG. 4, in the region between the beginning of the profile and the viscosity peak 412A. In this region, the starch granules are swelling as they absorb water. The other starch viscosity curves show either no swelling or very late swelling, and only after the temperature has been raised significantly.

Second, the location of the peak viscosity 412A, and the rapid descent in viscosity profile after the peak through the viscosity trough 412B and to the final viscosity 412C indicates it will behave ideally under supercritical fluid extrusion conditions. It not only forms a gel quickly, but also has desirable film forming properties. Without being limited by theory, Applicants believe that the supercritical fluid is injected into the starch mixture in the vicinity of its peak viscosity 412A, allowing the starch matrix to capture and stabilize the supercritical fluid. After the supercritical fluid is injected, the starch shows "shear thinning" characteristics, represented by the region between the viscosity peak 412A and the viscosity trough 412B, allowing it to efficiently flow through the extruder and die orifice. The shear thinning characteristics are also maintained through a range of temperatures and times following the viscosity peak 412A.

Third, the pregelatinized starch that works in accordance with the present invention comprises a desirable ratio of amylose to amylopectin in the starch. Starches that are high in amylose interfere with the crystallinity of amylopectin, and do not form gels that are as "sticky" as amylopectin-rich starches. However, amylose-rich starches form stronger gels and films. Without being limited by theory, Applicants believe that the amylose-rich starch helps stabilize and contain the supercritical fluid cells inside the extrudate, and maintains the expanded structure of the extrudate through post-extrusion processing, including drying operations. The starch used in accordance with the present invention has a low diffusivity of supercritical carbon dioxide, which stops the carbon dioxide from escaping the cells as they expand. The XPANDR612 starch is high in amylopectin before it is pregelatinized, but the gelatinization process converts some of the amylopectin to amylose, increasing the ratio of amylose to amylopectin in the starch.

The pregelatinized starches used in accordance with the present invention allow practitioners to effectively cut the extrudate into individual pieces at the die face (which was not possible with other types of starches), and provide a final product with an acceptable light, expanded, crispy texture, as opposed to the harder, crunchier texture imparted by the other starches that were tested.

Alternatively, native starches can be gelatinized in a unit operation before being passed into the supercritical fluid extruder. In order for such gelatinized starches to work in accordance with the present invention, they must exhibit characteristics similar to the XPANDR612 starch described above. The characteristics of native starches that are pregelled in a unit operation before extrusion can be controlled by selecting the starting ingredients, temperature, time, moisture and shear level imposed during the pregelling operation. These variables can be determined by one skilled in the art to arrive at the appropriate starch characteristics without undue experimentation after reading the disclosure herein. Also, the gelled starches must be cooled before being combined with any heat sensitive components that will ultimately be extruded through the supercritical fluid extruder, whether combined in a hopper that feeds the supercritical fluid extruder, or inside the extruder itself. In one embodiment, the gelled starch mixture is cooled to a temperature below about 90° C., and in a preferred embodiment, it is cooled to a temperature below about 80° C.

The input ingredients in one embodiment of the present invention also comprise at least one of fruit-based ingredients or vegetable-based ingredients. As used herein, the term fruit is used in the culinary sense and includes those botanical fruits that are sweet and fleshy. Examples of fruit include, without limitation, apple, strawberry, blueberry, cranberry, plum, peach, mango, banana, pear, grape and orange. The term vegetable is used herein in the culinary sense and includes those plant fruits that are savory, as opposed to sweet. Examples of vegetables include, without limitation, potatoes, sweet potatoes, sweet corn, yams, taro, plantains, green peas and lentils, pumpkin, tomato, onion, carrot, bell pepper, beet, cucumber, broccoli and squash. Each of the different fruits and vegetables used in the present invention are rich in different nutrients and each has nutritional benefits different from starchy grains, such as corn, rice and wheat.

In one preferred embodiment, the final snack pieces of the present invention incorporate at least 1 serving of fruits or vegetables per 1 ounce serving of the snack pieces. In another preferred embodiment, the snack pieces of the present invention incorporate at least 1.5 servings of fruits or vegetables per 1 ounce serving of the snack pieces. In yet another preferred embodiment, the snack pieces of the present invention incorporate at least 2 servings of fruits or vegetables per 1 ounce serving of the snack pieces.

The United States Department of Agriculture (USDA) defines a serving of vegetables as ½ cup of chopped vegetables. For example, ½ cup of 1 inch cubes of raw pumpkin constitutes 1 serving of pumpkin, and ½ cup of chopped or sliced raw tomatoes constitutes 1 serving of tomato under the USDA guidelines. A serving of vegetables can be understood as having a moisture content and a solids content. Vegetable solids and fruit solids are defined herein as the non-water components of vegetables and fruits, respectively. Thus, a serving of vegetables comprises a vegetable solids content on a dry basis and a serving of fruit comprises a fruit solids content on a dry basis. The USDA National Nutrient Database for Standard Reference defines the weight of the edible portion of a vegetable in that ½ cup and defines the average moisture and thus the vegetable solids content of the edible portion of a vegetable. Table 1, for example, depicts the nutrient profile for 1-cup or 180 grams of a red, ripe, raw, year round average tomato as accessed at http://www.nal.usda.gov/fnic/foodcomp/search/.

TABLE 1

Tomatoes, red, ripe, raw, year round average

| Nutrient | Units | Value per 100 grams | Number of Data Points | Std. Error | 1.00 × 1 cup, chopped or sliced 180 g |
|---|---|---|---|---|---|
| | | Proximates | | | |
| Water | g | 94.50 | 33 | 0.159 | 170.10 |
| Energy | kcal | 18 | 0 | | 32 |
| Energy | kj | 75 | 0 | | 135 |
| Protein | g | 0.88 | 19 | 0.039 | 1.58 |
| Total lipid (fat) | g | 0.20 | 26 | 0.034 | 0.36 |
| Ash | g | 0.50 | 19 | 0.018 | 0.90 |
| Carbohydrate, by difference | g | 3.92 | 0 | | 7.06 |
| Fiber, total dietary | g | 1.2 | 5 | 0.234 | 2.2 |
| Sugars, total | g | 2.63 | 0 | | 4.73 |
| Sucrose | g | 0.00 | 12 | 0.002 | 0.00 |
| Glucose (dextrose) | g | 1.25 | 16 | 0.135 | 2.25 |
| Fructose | g | 1.37 | 17 | 0.073 | 2.47 |
| Lactose | g | 0.00 | 9 | 0 | 0.00 |
| Maltose | g | 0.00 | 9 | 0 | 0.00 |
| Galactose | g | 0.00 | 4 | 0 | 0.00 |
| Starch | g | 0.00 | 4 | 0 | 0.00 |

USDA National Nutrient Database for Standard Reference, Release 19 (2006)

As used herein, a serving of fruit or a serving of vegetables is defined as the amount of fruit solids or vegetable solids content that is equivalent to ½ cup (118 cubic centimeters) of chopped fruit or vegetables on a dry basis based on the USDA National Nutrient Database for Standard Reference, Release 19, 2006, which is incorporated herein by reference. According to Table 1, one cup of red, ripe, raw, year round average tomatoes weighs 180 grams, has a water content of 94.5% by weight and a vegetable solids content of 5.5%. One vegetable serving of raw tomatoes (½ cup) has a total weight of 90 grams. Consequently, 4.95 grams (5.5% solids content×90 grams total weight) of tomato solids in a finished product is equivalent to one serving of vegetables. (As known to those skilled in the art, vegetable powders typically have an intrinsic moisture component, e.g., tomato powder may comprise less than about 4% moisture by weight. Consequently, the amount of tomato powder needed for one serving of vegetables may not exactly correspond to the amount of tomato solids needed for one serving of vegetables.) Thus, a snack piece having a one-third vegetable serving would have approximately 4.95 grams of tomato solids in a 1 ounce serving of snack pieces. Consequently, in one embodiment, vegetable solids can be added in an amount sufficient to provide for at least 0.5 vegetable servings or at least 1 vegetable serving, in a preferred embodiment in an amount sufficient to provide for a 1.5 vegetable servings, and in another preferred embodiment in an amount sufficient to provide for 2 or 2.5 vegetable servings. Applicants note that a snack product that has 2 vegetable servings will also have 1 vegetable servings and 1.5 vegetable servings. Therefore, these limits are interpreted as minimum values, inclusive of all higher levels of vegetable servings. As used herein, one serving of fruit or one serving of vegetables is defined as the amount of fruit or vegetable solids that is equivalent to ½ cup (118 cubic centimeters) of a chopped fruit or vegetables on a dry basis based on the USDA National Nutrient Database for Standard Reference, Release 19, 2006, which is incorporated herein by reference.

In one preferred embodiment of the present invention, vegetable powder is used as an ingredient in the extruded snack product of the present invention. The term vegetable powder, as used herein, is defined as partially dehydrated flakes of vegetable solids. Typically, vegetable powder will contain between about 1% and about 4% moisture. Vegetable powder may also contain ingredients such as rice flour and/or lecithin as processing aids. In one embodiment, the vegetable powder contains a mixture of different vegetable powders. Non-limiting examples of vegetable powders that can be used with the present invention include powders derived from tomatoes, carrots, green peppers, pumpkin, squash, cucumbers, spinach, broccoli, beets, red beets, parsley and onions.

In another preferred embodiment of the present invention, fruit powder is used as an ingredient in the extruded snack product of the present invention. The term fruit powder, as used herein, is defined as partially dehydrated flakes of fruit solids. Typically, fruit powder will contain between about 1% and about 4% moisture. Fruit powder may also contain ingredients such as rice flour and/or lecithin as processing aids. In one embodiment, the fruit powder contains a mixture of different fruit powders. Non-limiting examples of fruit powders that can be used with the present invention include powders derived from berries, strawberries, blueberries, raspberries, mangoes, banana, apples, pineapples, oranges, and cranberries.

Other heat-sensitive ingredients can be included in the input ingredients in accordance with other embodiments of the present invention. Whey proteins are susceptible to damage during thermal processing. When heated to temperatures above about 60° C. to about 70° C., proteins can become denatured, or lose the majority of their shape/conformation, and some hydrolysis can occur. Whey proteins also have reaction sites that will participate in the Maillard reactions with the sugars and dextrins present in starches when a mixture of whey protein and starch is heated. Whey proteins can be included in ingredient formulations with the present invention and survive the extrusion process without denaturing and without facilitating the Maillard reaction.

The present invention can also be used to include heat resistant starches in extruded product formulations. Heat resistant starches are those starches that can be subjected to high heat without altering the starch structure or gelatinizing. However, during prior art high temperature/high shear extrusion processes, when resistant starches are included along with nonresistant starches, the resistant starches will break down. By contrast, the heat resistant starches will survive the process and apparatus of the present invention, and allow a practitioner to increase the fiber content of the final product.

Applicants herein have also determined that the input moisture content of the starting ingredients should preferably be between about 25% and 35% by weight. The minimum moisture content Applicants have used to make an acceptable product was 16% by weight with some formulations (20% minimum works better with most formulations), and the maximum value for input moisture content is 40% by weight. The amount of added water needed to achieve the preferred moisture content will vary depending on the moisture content of the starting ingredients. If the fruit or vegetable content comprises fruit or vegetable powders, more water may be needed, whereas less water may be added if fruit or vegetable juices or purees are used as starting ingredients.

Extrudates that resulted from input moisture contents of greater than 40% were too soft to allow a practitioner to effectively cut the extrudate into individual pieces at the die face, had a structure that collapsed shortly after exiting the die face, and required too much post-extrusion drying to achieve an acceptable final product. When the input moisture below 15%, the mixture may fail to create a cohesive dough or melt, fail to dissolve and entrap the supercritical fluid, and heat up inside the extruder due to friction and reach temperatures well above 100° C. For example, Applicants have observed that ingredient mixtures hydrated to less than 15% moisture make a "popping" sound as they exit the extruder die orifice, indicating that supercritical fluid is escaping from the extrudate and not contributing sufficiently to product expansion. The popping is also the result of water vapor (steam) flashing out of the extrudate. Thus, 15% is not the theoretical minimum for moisture content of the hydrated ingredient mixture. The moisture content for a given ingredient mixture can be reduced until it starts producing steam as it exits the die on the extruder.

The result of using an inadequately hydrated ingredient mixture is that the extrudate does not have the desirable puffed expanded texture. By contrast, when moisture contents of between 15% and 40% are used, the extrusion process is comparatively quiet, and the extrudate retains and increases its expanded structure during post-extrusion operations. In a preferred embodiment, the moisture content of the mixture inside the extruder is between 20% and 40% by weight.

Specific product formulations in accordance with the present invention should include, on a dry basis, at least 30% of the pregelatinized starch described above, and can include, when a circular die is used, up to 50% fruit or vegetable powder (or a mixture thereof) on a dry basis, and still retain the expanded, crispy texture desired by consumers. When a flat die is used to produce a sheet-like extrudate, even higher levels of fruits and vegetable powder—up to 60% by weight on a dry basis—can be used with the present invention. Additionally, up to 10% by weight, on a dry basis, of native (non-pregelatinized) starches can be included in formulations of the present invention and still produce a product with the desired structure and texture.

In sum, when ingredients that comprise heat-sensitive components are combined with the pregelatinized starches described above and at the preferred moisture content range, an extrudate is produced that can be cut at the die face using a rotary cutter that is known in the art. The cut extrudate pieces adequately retain their shape and structure as they are collected near the die exit. Such extrudate pieces are unknown in the art.

In other embodiments of the present invention, different die orifice shapes can be used to create extrudate pieces that have desirable physical attributes. In one embodiment, a circular die is used to create approximately cylindrical extrudate pieces, or if short extrudate pieces are cut, the resulting extrudate piece may resemble a sphere, spheroid, ovoid, or ellipsoid. In this embodiment, the supercritical fluid turns from liquid to gas upon reaching atmospheric pressure, and expands the extrudate in a radial direction while escaping from the interior of the extrudate through the outer surface. In another embodiment, a ring shaped (or annular) die orifice is employed. In this embodiment, it is possible to create a cylindrical extrudate with a lower density than created by a circular die. The extrudate that emerges from an annular die has a lower density because it has a greater level of expansion. Not only does carbon dioxide gas exit and expand the extrudate in an outward radial direction, it also expands the extrudate in an inward radial direction. The inner and outer diameter of the annulus can be chosen such that the inward expansion completely closes the hole that is initially present in the extrudate when it exits the die face. In an alternative embodiment, the diameters of the annulus can be chosen such that an axial hole remains in the extrudate after gas expansion is complete. The diameters used to form each type of extrudate will depend on the product formulation and moisture content, as well as the supercritical fluid conditions and other processing conditions inside the extruder.

In another embodiment of the present invention, post-extrusion processing steps are used to either set the structure of the extrudate, or alter it significantly. In one embodiment, the cut extrudate pieces are dried in an oven at atmospheric pressure and temperatures below 100° C. In this embodiment, the heat-sensitive components also survive the drying step, and the resulting dried snack piece retains a high proportion of the starting level of heat-sensitive components.

If the ingredients are extruded through a circular die orifice, the resulting extrudate pieces resemble imperfect cylinders, which occasionally exhibit discontinuities such as bending and other surface non-uniformities. However, when these pieces are dried, they form a smooth skin over the outer surface. Applicants observe that the outer surface of these supercritical fluid extruded products is smoother than the outer surface of traditional direct expanded products. When Applicants have seasoned these novel products with a typical oil/seasoning slurry, Applicants have noted that less oil sticks to the surface, resulting in a lower oil content in the final, seasoned snack piece.

Furthermore, when these supercritical fluid extrudates are fried in hot oil, they have been found to absorb far less oil than a traditional high temperature, direct expanded puffs. When one sample of direct expanded puffs produced using a twin screw extruder was fried in hot oil for 30 seconds, the puffs had an oil content after the frying step of about 75%. When another sample of direct expanded puffs produced using a random extruder was baked in an oven and then finish fried in hot oil, the puffs had an oil content of about 31% by weight. Applicants also fried in hot oil twelve samples of supercritical fluid extrudate pieces made according to the present invention and dried using either impingement drying or convection drying. These fried samples comprised an oil content of between about 15% and 20% by weight. Thus, the supercritical fluid extrudates show a surprising resistance to oil absorption when seasoned or fried.

In another embodiment, post-extrusion processing is used to alter the shape and structure of the cut extrudate pieces. In a preferred embodiment, post-extrusion vacuum drying is used to create a snack piece with a novel structure. Applicants herein have extruded a mixture of 20% cranberry powder (pomace), 80% pregelatinized starch (dry basis) and water through the supercritical fluid extrusion apparatus described above, through a circular die orifice. The extrudate was cut into pieces between about 1 and 2 inches in length. These pieces were then dried at about 60° C., and between 15 mmHg and 20 mmHg below atmospheric (−15 mmHg to −20 mmHg gauge pressure). During the vacuum drying process, an axial hole formed in the snack piece throughout the length of the cylinder. FIG. 2 shows a perspective view of such a snack piece. Again, when the extrudate originally exited the die face and was cut into pieces, it was a relatively continuous piece with no axial hole. It was only after the vacuum drying that the axial hole formed, giving the final snack piece a unique structure and texture. The post-extrusion processing in this embodiment was not used to set the structure of the extrudate as it exited the extruder, but rather to drastically alter the structure and form a novel snack piece. Without being limited by theory, Applicants believe that the insoluble fiber content of the cranberry pomace, which generally comprises fiber particles between 100 microns and 700 microns in size, destabilized the walls surrounding the internal gas cells, causing them to merge and form the observed axial hole. Regardless of theory, Applicants have demonstrated that post-processing can be used to alter the structure of the initial extrudate, and create products with novel structures and textures.

Although the extrudate in the above example was extruded at atmospheric pressure and then transferred into a vacuum dryer, in another embodiment the extrudate is extruded directly into a vacuum chamber. The extrudate can be cut at the die face as in the example above, or cut into pieces after being dried under vacuum. Extruding directly into the vacuum chamber will increase the expansion ratio of the extrudate, for a given level of supercritical fluid dissolved in the dough, over what the expansion ration would be at atmospheric pressure.

In still another preferred embodiment, the cut extrudate pieces were subjected to a post-extrusion baking process that used high heat transfer coefficients to further puff the snack pieces. Applicants herein extruded a vegetable powder, pregelatinized starch and water mixture through the supercritical fluid extrusion apparatus described above, through a flat die orifice. The extrudate was cut into approximately square or rectangular pieces measuring between about 1 and 2 inches on a side. Upon exiting the extruder and being cut into pieces, the extrudate exhibited some puffing in its structure. However, when fully dried (to a moisture content of less than about 5%) in a jet impingement oven at between about 220° F. and 280° F. for at least 10 minutes, the extrudate pieces puffed up much more noticeably, and resembled the shape of a bed pillow. Alternatively, the jet impingement oven can be used for a time period sufficient to set the pillow structure of the extrudate pieces, but not fully dry them. After the pillow structure is set, the pieces can be finish dried at lower temperature, or using other techniques known in the art. FIG. 3 shows a perspective view of such a snack piece. Here again, the post-processing was not used to set the structure of the extrudate as it exited the extruder, but rather to alter the structure and form a snack piece with a shape and texture that is unknown in the art. When the snack piece is broken in half, the interior portion of the snack piece appears to have a lower density than the exterior portion.

EXAMPLES

Various formulations of vegetable and/or fruit powders, XPANDR612 starch, and other minor ingredients (less than 1% by weight each) such as salt, were run through a supercritical fluid extrusion apparatus through a 3 mm diameter die orifice. In all tests, the supercritical fluid was injected at a rate of 1% by weight of the extruded ingredients, and the ingredients were hydrated to a moisture content of between 21% and 25%.

TABLE 1

Example Ingredient Formulations

| Run # | Vegetable/Fruit Components | Weight Percent Fruit or Vegetable (dry basis) | Weight Percent Starch (dry basis) | Servings of Fruit or Vegetable (per ounce) |
|---|---|---|---|---|
| 1 | Tomato Powder | 20 | 77.5 | 1 |
| 2 | Tomato Powder | 40 | 57.5 | 2 |
| 3 | Tomato Powder | 20 | 61.5 | 2 |
|   | Carrot Powder | 16 |  |  |
| 4 | Apple Powder | 34 | 64 | 2 |
| 5 | Mango Powder | 27 | 71 | 1 |
| 6 | Blueberry Powder | 22 | 76 | 1 |
| 7 | Raspberry | 16 | 82 | 1 |

The extrudates resulting from the formulations above were cut at the die face using a commercially available rotating die face cutter, and dried using in an impingement dryer with air a temperature between about 80° C. and 90° C. The dried extrudates were then measured for diameter, radial expansion ratio, density, water solubility and water activity, so that they could be compared to known direct expanded corn starch puffs. The diameter was measured using calipers, and the expansion ratio was calculated by dividing the diameter by the 3 mm orifice diameter. The density measured was a true density, and not a bulk density. To measure the true density, an extrudate piece was weighed, and then the volume was measured by packing a graduated cylinder with small glass beads and the extrudate piece, then removing the extrudate piece, and recording the difference in volume. The water solubility index and water activity index were measured using the following protocol: A 0.5 gram sample of the extrudate piece was mixed well with 15 mL of water. The mixture was then centrifuged in a vial until a cake separated at the bottom from a supernatant liquid. The cake was then fully dried, and the weight of the remaining solids was recorded as the water activity index. The supernatant liquid was fully dried, and the weight of the remaining solids was recorded as the water solubility index. The following table contains these properties for the example formulations in Table 1 above.

TABLE 2

Example Extrudate Properties

| Run # | Diameter (mm) | Expansion Ratio | Density | Water Solubility Index | Water Activity Index |
|---|---|---|---|---|---|
| 1 | 13.4 | 4.5 | 0.175 | 0.3 | 0.2 |
| 2 | 10.6 | 3.5 | 0.15 | 0.2 | 0.3 |
| 3 | 12.8 | 4.3 | 0.1 | 0.2 | 0.3 |
| 4 | 10.0 | 3.3 | 0.175 | 0.2 | 0.3 |
| 5 | 11.3 | 3.8 | 0.07 | 0.2 | 0.3 |
| 6 | 13.0 | 4.3 | 0.15 | 0.25 | 0.25 |
| 7 | 12.1 | 4.0 | 0.1 | 0.1 | 0.4 |

For comparison purposes, a known puffed extruded snack product made using corn starch and high temperature direct expansion, has an expansion ratio of 3.6, a density of 0.05, a water solubility index of 0.12 and a water activity index of 0.38. Thus, the inventive method and formulation can produce products very similar in physical characteristics to known corn puffs produced using high temperatures, but the inventive compositions have high levels of fruits and vegetables, and are produced at low temperatures, allowing the nutrients, natural flavors and other heat-sensitive components to survive.

An example was also run using tomato puree as the hydrating fluid instead of water. The tomato puree comprised about 12% tomato solids. Applicants believe that the upper limit for solids in a tomato puree as a hydrating fluid for the present invention is about 20% solids, because above that level, the puree is very thick and will not adequately hydrate the starch in the 45 second to 1 minute the ingredients reside inside the extruder. The extrudates produced using the 12% solids tomato puree were cut at the die face and dried using impingement drying. They also had physical characteristics similar to the examples described above. Using a puree instead of a powder to hydrate the mixture may impart the additional advantage of providing fruit or vegetable inclusions which are visible in the final food product. Visible fruit or vegetable inclusions can also be added to other ingredient mixtures.

Several examples were run using different levels of pregelatinized oat flour as an ingredient in addition to the starch and fruit products described above. Applicants found that when pregelatinized oat flour is used at levels greater than 30% by weight of the ingredient mixture on a dry basis, the resulting extrudate would expand but quickly collapse after exiting the die orifice. By contrast, when pregelatinized oat flour was used at levels of 30% or less, and especially 25% or less (down to a minimum of about 1%), the extrudate adequately maintained its expansion ratio upon exiting the die orifice.

Hence, in one embodiment, this invention produces an expanded or puffed food product and method for making whereby a puffed snack food is made that has a high content of ingredients that comprise heat-sensitive components, and texture characteristics similar to conventionally produced puffed snack products. In addition, the food pieces disclosed herein meet or exceed the other preferred nutritional goals.

In other embodiments, the food pieces can generally comprise a wide variety of food products or intermediates, including puffed snack products, cereal products, bars, or powders. A powdered food product made according to the present invention can be added to water to make a soup, or to milk to make a desirable fruit or vegetable drink. The powdered food intermediate can be made by various techniques and processes, including without limitation pulverizing or grinding the extrudate pieces described above into smaller pieces, or finely cutting or shaving the extrudate as it passes through the die during extrusion. The pregelatinized starch used with the present invention allows such powders to hydrate quickly when added to liquids, which allows a practitioner of the present invention to provide consumers with an easy method of making an instant soup or beverage with high levels of fruit, vegetable, or other heat sensitive components.

While this invention has been particularly shown and described with reference to a preferred embodiment, it will be understood by those skilled in the art that various changes in form and detail may be made therein without departing from the spirit and scope of the invention.

What is claimed is:

1. A method for making a food product comprising:
    introducing into an extruder ingredients comprising by weight on a dry basis:
        at least one heat-sensitive ingredient chosen from the group consisting of fruit-based ingredients, vegetable-based ingredients, proteins, natural flavoring compounds, synthetic flavoring compounds, and coloring agents;
        at least 30% starch comprising a peak viscosity of between about 500 and about 700 RVU at a time between about 1 and 6 minutes, a trough viscosity of between about 20 and 60 RVU at between about 12 and 18 minutes, and a final viscosity of between about 45 and 85 RVU at about 19 minutes, as measured using the RVA Protocol;
    hydrating said ingredients to a total moisture content between about 15% and 40% by weight to produce a hydrated ingredient mixture;
    injecting a supercritical fluid into said extruder to mix with said ingredients at a rate greater than 0% and less than about 3% by weight of said hydrated mixture;
    forming an expanded extrudate by extruding said ingredients through at least one die orifice;
    cutting said extrudate into extrudate pieces, wherein said cutting step further comprises cutting said extrudate at a die face, wherein said extrudate pieces retain their expansion during at least one subsequent drying operation; and
    maintaining said ingredients at a temperature below 100° C. between said introducing step and said cutting step.

2. The method of claim 1 further comprising:
    dehydrating said extrudate pieces to a moisture content of between about 0.8% and about 5% by weight to produce puffed snacks.

3. The method of claim 1 wherein said maintaining step further comprises maintaining said ingredients at a temperature below 90° C. between said introducing step and said cutting step.

4. The method of claim 1 wherein said maintaining step further comprises maintaining said ingredients at a temperature below 80° C. between said introducing step and said cutting step.

5. The method of claim 2 wherein said ingredients further comprise insoluble fiber, and wherein said dehydrating step comprises drying said extrudate pieces having no axial hole under vacuum, thereby producing dried extrudate pieces having an axial hole.

6. The method of claim 2 wherein said dehydrating step comprises jet impingement drying, thereby producing a puffed snack with an interior portion having a lower density than an exterior portion.

7. The method of claim 1 wherein said at least one heat-sensitive ingredient comprises fruit powder or vegetable powder or mixtures thereof, wherein said ingredients introduced into said extruder comprise at least 10% by weight said fruit powder or said vegetable powder.

8. The method of claim 1 wherein said at least one heat-sensitive ingredient comprises whey protein.

9. The method of claim 5 wherein said die orifice is round, and wherein said dehydrating step produces a dry extrudate piece comprising an axial hole.

10. The method of claim 1 wherein said at least one heat-sensitive ingredient comprises fruit puree or vegetable puree or a mixture thereof.

11. The method of claim 1 wherein said ingredients comprise between 1% and 10% native starch.

12. The method of claim 1 wherein said ingredients comprise between 1% and 30% pregelatinized oat flour.

* * * * *